United States Patent [19]
Deem

[11] Patent Number: 4,798,968
[45] Date of Patent: Jan. 17, 1989

[54] BATTERY DISCONNECT APPARATUS

[76] Inventor: James R. Deem, 1855 Belmont, Boise, Id. 83706

[21] Appl. No.: 51,051

[22] Filed: May 15, 1987

[51] Int. Cl.[4] .............................................. H01H 71.46
[52] U.S. Cl. ............................. 307/10 BP; 307/10 R; 200/61.52; 200/61.47; 180/282; 439/754
[58] Field of Search ................. 307/9 R, 10 R, 10 AT, 307/10 BP, 112, 132 E, 132 R, 141; 200/61.66, 61.46, 61.50, 61.45 R, 61.45 M, 61.52; 180/271, 282, 283; 340/52 R, 52 F, 52 H, 64

[56] References Cited

U.S. PATENT DOCUMENTS

| | | | |
|---|---|---|---|
| 2,442,445 | 6/1948 | Toelle | 339/224 X |
| 2,700,708 | 1/1955 | Wall | 200/61.52 |
| 2,729,802 | 1/1956 | Jordan et al. | 339/224 |
| 2,770,689 | 11/1956 | Gonzalez | 200/61.52 |
| 3,229,109 | 1/1966 | Wilson | 307/10 R |
| 3,243,537 | 3/1966 | Jezek | 180/282 X |
| 3,259,202 | 7/1966 | Griffeth | 200/61.52 X |
| 3,371,171 | 2/1968 | Gregory | 200/61.47 X |
| 3,602,660 | 8/1971 | Eslinger | 200/61.5 |
| 3,641,290 | 2/1972 | Murphy et al. | 200/61.45 M |
| 3,783,211 | 1/1974 | Panettieri | 200/61.5 |
| 4,144,422 | 3/1979 | Ramos | 200/61.52 |
| 4,163,127 | 7/1979 | Herou | 200/61.47 |
| 4,310,817 | 1/1982 | McNiel | 307/10 R |

Primary Examiner—William M. Shoop, Jr.
Assistant Examiner—Paul Ip
Attorney, Agent, or Firm—Leslie G. Murray

[57] ABSTRACT

Battery disconnect apparatus (1) for interrupting flow of power through an electrical circuit. A circuit breaker (3) is connected between a battery (B) and one or more components connected in the circuit. A switch (23) holds the circuit breaker in its closed position and moves the circuit breaker from its closed to an open position thereby interrupting the circuit. A force responsive mechanism 37 triggers the switch in response to extraordinary forces being exerted on a vehicle in which the battery and components are installed.

19 Claims, 2 Drawing Sheets

BATTERY DISCONNECT APPARATUS

BACKGROUND AND SUMMARY OF THE INVENTION

This invention relates to vehicles such as airplanes, automobiles and the like and more particularly to an improvement and apparatus for interruption of power to all electrical circuits in a vehicle in the event of a collision.

It is well known that fires commonly occur after an airplane crash and also occur, though with less frequency, in automobile collisions. One way in which fires happen is for the vehicle's fuel tank to be ruptured and the resulting spilled fuel being ignited by an electrical spark. To prevent a fire and the often accompanying tragedy, it would be beneficial if vehicles were equipped with a mechanism that was activated during a crash and which shut-off electrical power to the vehicle thus eliminating electrical sparks.

The improvement and apparatus of the present invention provides such a mechanism. It is an object of the present invention that the apparatus be readily installed on the vehicle. Further, it is an object of the present invention that the apparatus not respond to every force to which the vehicle is subjected by cutting off electrical power; but rather, that it do so only in the event the vehicle is subjected to extraordinary forces such as occur during a crash. A still further object of the present invention is that the apparatus be easily reset. Another object of the present invention is that the apparatus be oriented to respond to impact forces occurring along either the longitudinal or transverse axis of the vehicle whereby the apparatus properly responds to these forces regardless of the direction from which they come.

BRIEF DESCRIPTION OF THE DRAWINGS

Corresponding reference characters indicate corresponding parts throughout the several views of the drawings.

DESCRIPTION OF PREFERRED EMBODIMENTS

Figure 1:
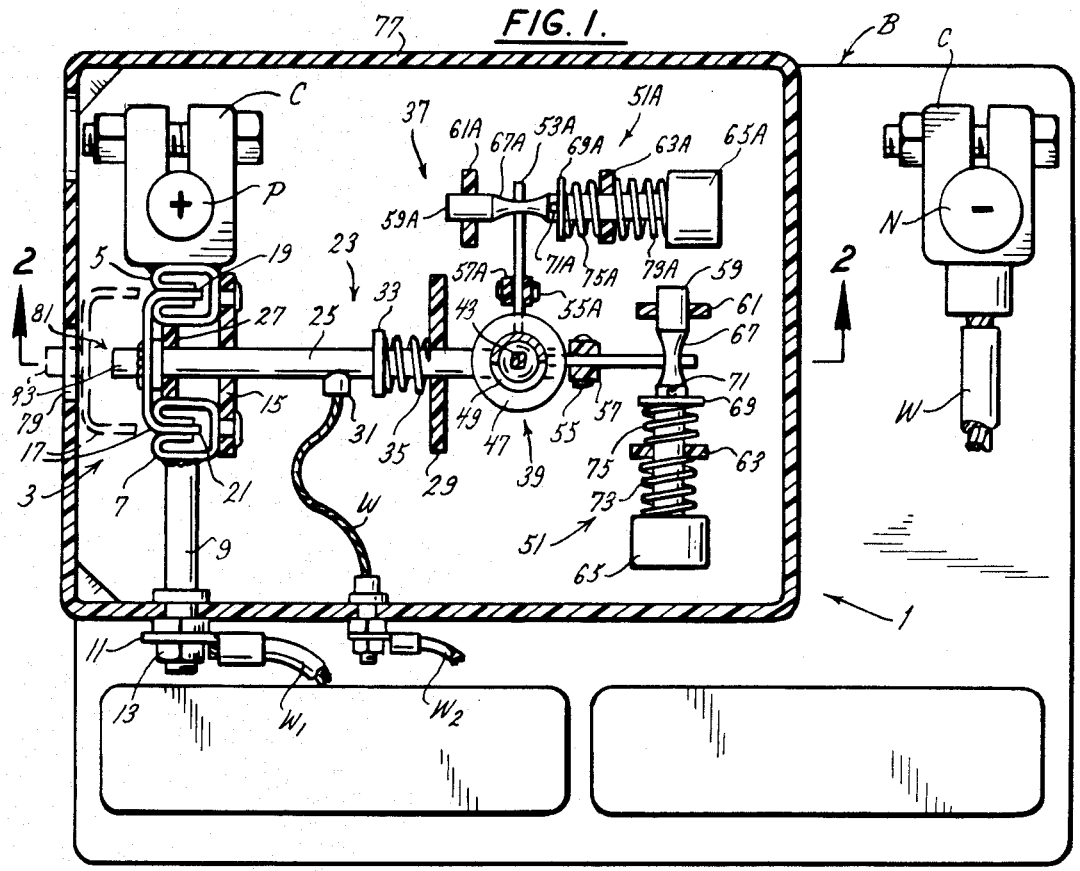
FIG. 1 is a top plan view of a battery used on vehicles with the battery disconnect apparatus of the present invention installed.

Referring to the drawings, a vehicle (not shown) such as an airplane, an automobile or a boat has an electrical circuit by which power is supplied from a battery B installed on the vehicle to one or more electrical components (also not shown) which are also installed on the vehicle and utilized for a variety of purposes. Sometimes, vehicles are involved in crashes and occasionally, the crash causes the flammable fuel used to power the vehicle to spill on or near the vehicle. Also, a crash may disrupt the electrical circuit and electrical sparks may result. The presence of sparks near a flammable liquid can cause a fire which not only causes further damage to the vehicle but may also harm passangers or those near the vehicle.

An improvement to the vehicle is the battery disconnect apparatus of the present invention which is indicated generally 1 and which functions to disrupt or interrupt flow of power through the electrical circuit in the event of a crash thereby eliminating the possibility of electrical sparks and removing one possible source of combustion. As shown in FIG. 1, battery B has a positive terminal P and a negative terminal N, these also being identified by the "+" and "—" sign respectively. Electrical wires W are connected to these terminals by appropriate electrical clamps C. The wires are routed through the vehicle to one or more electrical components such as, for example, an alternator. W1 is the main electrical power and W2 is power to the engine ignition such that actuation of the cutoff will stop the engine. Typically, more than one electrical circuit is routed through the vehicle. Thus, a wire W1 may comprise the main electrical power circuit while a wire W2 is connected to the vehicle's ignition. Cutting off flow of power, or electricity, through wire W2 would then stop the engine powering the vehicle.

The battery disconnect apparatus 1 first comprises a circuit breaker means indicated generally by 3. The circuit breaker means is connected in the electrical circuit between the battery and the components. A female connector 5 is attached to the clamp C connecting with terminal P. A second, and vertically separated female connector 7, is connected to an electrically conductive rod or bar 9. The other end of bar 9 is threaded. An eyelet connector 11 is secured to said other end of the bar 9 with a nut 13, and connector 11 is attached to one of the wires W1 forming the main electrical circuit. Connector 7 and 9 are secured to a non-electrically conductive support 15. Consequently, the circuit is open between the two female connectors.

The circuit breaker means 3 also includes an electrically conductive bridging element 17, which, as shown in FIG. 1, is U-shaped. Element 17 spans connectors 5 and 7 and the legs of the element each form a male connector, 19 and 21, which respectively mate with female connectors 5 and 7. When the bridging element 17 is in its solid line position shown in FIG. 1, the male and female connector are mated, circuit breaker means 3 is in its closed position, and electrical power from battery B flows through the circuit. When element 17 is in its dashed line position shown in FIG. 1, the male and female connectors are disconnected, circuit breaker means 3 is in its open position, and power flow from the battery is interrupted. Under normal circumstances, means 3 is in its closed position with batter power flowing through the circuit.

The battery disconnect apparatus 1 next includes a switch means generally indicated 23 for holding circuit breaker means 3 in its closed position and for moving the circuit breaker means from its closed to its open position. Switch means 23 includes a shaft 25 which extends horizontally across and above the upper surface of battery B and projects through openings in a support 27, support 15, and a support 29. Shaft 25 is electrically conductive and has a port 31 approximately midway along its length. Thus, the shaft forms a portion of the electrical circuit. Ignition wire W2 is connected to the shaft at this point.

A plate 33 is integrally formed with or fitted over shaft 25 and is located on the shaft at point between supports 15 and 29. A spring 35 seats against the left face of support 29 (as viewed in FIG. 1) and bears against the right face of plate 33. Spring 35 urges shaft 25 to the left as shown in FIG. 1, this being the direction of movement to open circuit breaker means 3.

Battery disconnect apparatus 1 also includes a force responsive means generally designated 37 for triggering switch means 23 to move circuit breaker means 3 from its closed to its open positon. This triggering action is done in response to the vehicle being subjected to extraordinary forces such as occur during a crash.

Figure 2:
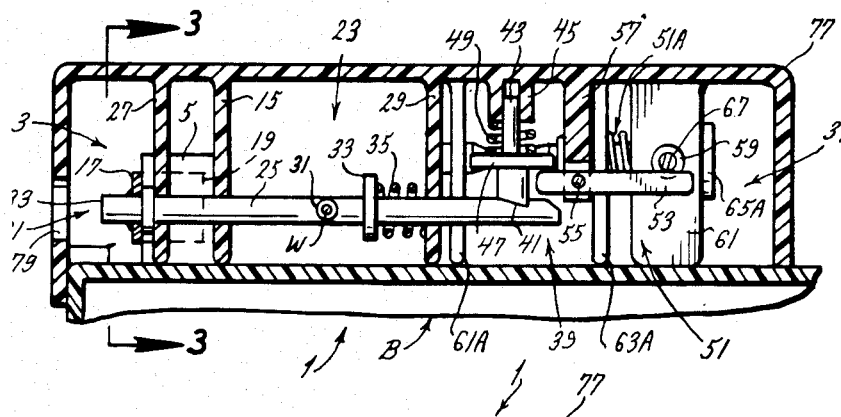
FIG. 2 is a sectional view, in elevation, taken along line 2—2 in FIG. 1 and illustrating the apparatus in its normal (unactivated) condition.
Figure 3:
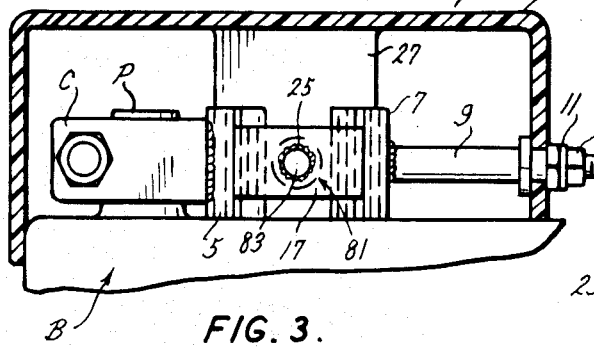
FIG. 3 is a sectional view, also in elevation, taken along line 3—3 in FIG. 2 and illustrating a portion of the apparatus.

Force responsive means 37 includes a retention means 39 for holding shaft 25 in its position shown in FIGS. 1 and 2. In this position, circuit breaker means 3 is closed and battery power flows through the circuit. A notch 41 is formed in the top of shaft 25 at the end of the shaft opposite the bridging element. Retention means 39 includes a pin 43 which is vertically oriented and includes a lower end formed to fit into the notch 41. A circular support 45 forms a sleeve in which the upper end of the pin slides. The pin also includes a plate 47 intermediate its ends and a spring 49 seats against the lower face of support 45 and bears against plate 47 to urge the pin downward as shown in FIG. 2. This downward force keeps the lower end of the pin 43 in the notch 41 and maintains the shaft 25 in the position shown in FIGS. 1 and 2. With the pin 43 in this position, leftward movement of shaft 25 is prevented.

Force responsive means 37 includes activation means 51 for moving retention means 39 and allowing spring 35 to move shaft 25. Actuation means 51 includes a lever 53, one end of which acts on pin 43. Lever 53 is pivoted at 55 and said one end of the lever rests against the underside of plate 47. The lever is carried between a bifurcated support 57 with pivot 55 constituting a pin extending through the support arms and the lever 53.

Actuation means 51 also includes a spring-loaded rod 59 set at a right angle to lever 53. Rod 59 is carried at one end and in the middle by respective supports 61 and 63. A weight 65 is affixed to the other end of the rod. Rod 59 has a reduced diameter section 67 intermediate the end carried on support 61 and support 63. This reduced diameter section is tapered at each end from the regular diameter portion of the rod. In addition, the outer end of lever 53 bears against the underside of section 67.

A plate 69 fits over the normal diameter portion of rod 59 and is positioned on the rod between reduced diameter section 67 and support 63. The plate is held in this position by a pin 71. A spring 73 bears against one face of support 63 and bears against a weight 65 attached to the end of rod 59. A second spring 75 seats against the other face of support 63 and bears against support 69.

Figure 4:
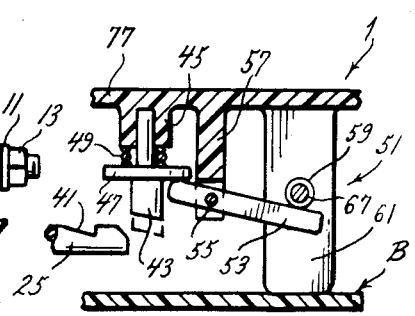
FIG. 4 illustrates a portion of the apparatus shown in FIG. 2 after the apparatus has been activated.

Actuation means 51 responds to forces exerted on the vehicle by movement of rod 59 against the effect of springs 73 and 75. Weight 65 acts as an inertia mass to provide the actuation force required in the event of a crash. If the vehicle is subjected to extraordinary forces, such as occur during a crash, rod 59 moves sufficiently for a relatively thicker diameter portion of the rod to bear against and depress by camming action the outer end of lever 53. As shown in FIG. 4, when the outer end of the lever 53 is depressed, the inner end of the lever raises or unseats pin 43 so it is lifted out of notch 41. As previously noted, this results in shaft 25 being forced to the left by spring 35 and circuit breaker means 3 being opened.

Force responsive means 37 includes a second actuation means 51A, which is identically structured to the first actuation means 51 and oriented at right angles to it. Further, means 51 is aligned parallel to the longitudinal axis of the vehicle while means 51A is aligned parallel to the transverse axis of the vehicle. This arrangement insures that apparatus 1 functions properly regardless of the direction from which the force acts on the vehicle.

The battery disconnect apparatus 1 includes a cover 77, preferably of impact resistant plastic or the like, which partially covers the top of battery B although it will be understood that the cover could extend the full length of the battery if desired. The various supports described above, such as 15, 27 and 29, are integrally formed with the cover. The cover has an opening 79 in its side adjacent circuit breaker means 3. The apparatus includes a reset means 81 comprising a pushbutton 83 attached to the outside of bridging element 17. When circuit breaker means 3 opens, pushbutton 83 projects through opening 79 as shown in the dashed line representation of the bridging element in FIG. 1. The pushbutton allows the circuit breaker means to be re-closed, thereby re-establishing the circuit, and causes pin 43 to be re-seated in notch 41.

Figure 5:
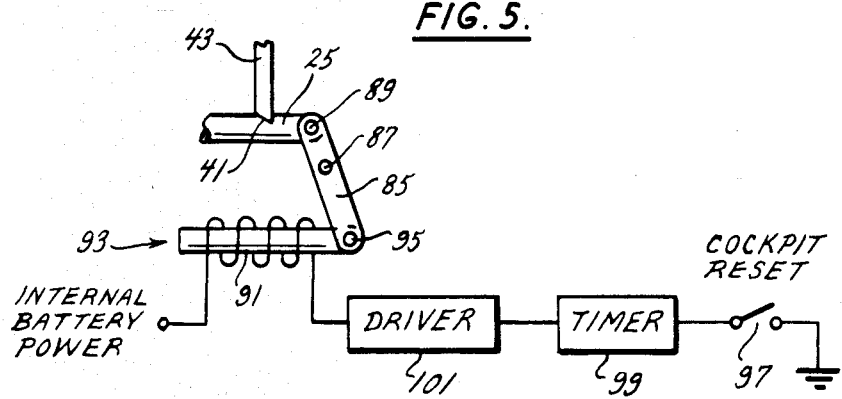
FIG. 5 is a schematic representation of the operation of a reset feature of the apparatus for use in aircraft.

Referring to FIG. 5, a reset mechanism for use in vehicles such as aircraft is illustrated. The function of this mechanism is to insure that the vehicle is not left without power. As shown in FIG. 5, pin 43 is seated in notch 41 of shaft 25. A link 85 is pivoted at 87 and connected to the end of shaft 25 by a pin 89. The other end of the link is connected to the armature 91 of a solenoid 93 by a pin 95. A manually operable reset switch 97 is located in the cockpit of the aircraft and is connected to electrical ground CRD. Switch 97 is connected to solenoid 93 via a timer 99 and a driver 101, both of which are well known in the art and will not be described.

When apparatus 1 functions as previously described, pin 43 is pulled from notch 41 allowing shaft 25 to move to the left as shown in FIG. 5. When the pilot hits switch 97, solenoid 93 is energized and armature 91 is pulled to the left. This, in turn, moves armature 25 to the right, via link 85 and pin 43 is reseated in the notch. Thus, the apparatus is reset and power restored.

Figure 6:
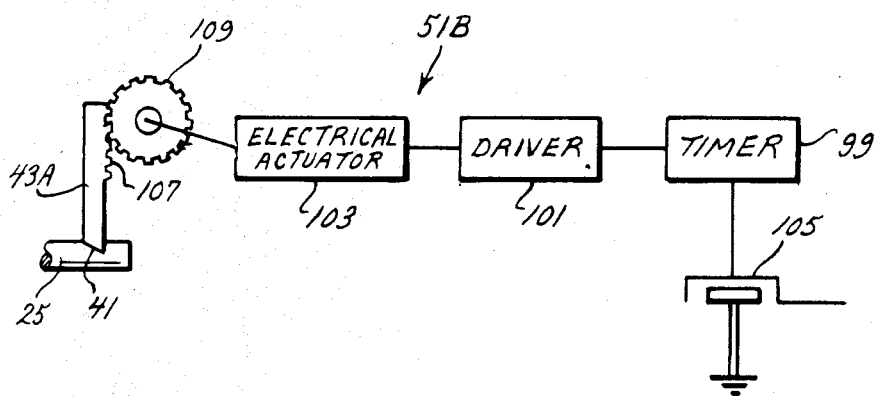
FIG. 6 is a schematic representation of a first alternate mechanism for activating the apparatus.

Referring to FIG. 6, an alternate actuation means 51B, providing a second embodiment, includes an electrical actuator or motor 103. Motor 103 is connected to timer 99 and driver 101. A pendulum switch 105 is connected between electrical ground GRD and the timer. When the vehicle is subjected to extraordinary forces, pendulum switch 105 closes and provides a ground for driver 101. Driver 101 activates motor 103 with timer 99 providing an ample time period for the motor to function.

A pin 43A has a rack 107 formed on the side thereof and the rack intermeshes with a pinion gear 109. Motor 103 drives gear 109 to raise pin 43A.

Thus, when energized, the motor drives the rack and pinion arrangement to retract pin 43A from notch 41 and free shaft 25 to move under the force of spring 35.

In view of the above the several objects of the invention are attained.

What is claimed is:

1. In a vehicle having an electrical circuit for supplying power from a battery on the vehicle to one or more electrical components utilized on the vehicle, apparatus for interrupting the flow of power through said circuit, said apparatus comprising:
   first and second female electrical connectors connected in said electrical circuit with said electrical circuit being open between said first and second female electrical connectors;
   an electrically conductive bridging element having first and second male connectors respectively mating with said first and second female electrical connectors electrically coupling said first and second female electrical connectors together when said bridging element is in an open position;
   switch means for holding said bridging element in its closed position and for moving said bridging element from its closed position to its open position; and
   force responsive means for triggering said switch means to move said bridging element from its closed position to its open position in response to said vehicle being subjected to extraordinary forces such as occur during a crash.

2. The apparatus of claim 1 wherein said switch means includes a shaft connected to said bridging element and a spring urging said shaft in a direction to move said bridging element to its open position.

3. The apparatus of claim 2 wherein said force responsive means includes retention means for holding said shaft in its position whereat said bridging element is in its closed position, said retention means holding said shaft in this position against the force of said spring.

4. The apparatus of claim 3 wherein said force responsive means further includes actuation means for moving said retention means and allowing said spring to move said shaft and said bridging element to its open position thereby interrupting said circuit.

5. The apparatus of claim 4 wherein said shaft has a notch formed therein and said retention means includes a spring-loaded pin, one end of which is formed to fit in said notch and prevent movement of said shaft.

6. The apparatus of claim 5 wherein said actuation means includes a lever, one end of which acts on said pin to unseat it from said notch, and a spring-loaded rod having a reduced diameter section intermediate its ends, said reduced diameter section bearing against the other end of said lever, said rod tapering from its thicker end sections to its reduced diameter section and said rod moving in response to any extraordinary force, such movement resulting in a relatively thicker diameter portion of said rod bearing against said lever to move said lever and unseat said pin.

7. The apparatus of claim 6 wherein said force responsive means includes a second actuation means similar to the first said actuation means and oriented at right angles thereto, the first said actuation means being aligned parallel to the longitudinal axis of said vehicle and the second actuation means parallel to the transverse axis thereof.

8. The apparatus of claim 7 further including reset means for reclosing said bridging element after a power interruption.

9. The apparatus of claim 8 wherein said reset means includes a manually operable pushbutton attached to said bridging element for pushing said shaft against the force of said spring until said pin reseats in said notch.

10. The apparatus of claim 9 further including a cover fitting substantially over said battery and including integrally formed supports for elements comprising said first and second female electrical connectors, bridging element, switch means and force responsive means.

11. The apparatus of claim 4 further including manually activated reset means for restoring battery power.

12. The apparatus of claim 11 wherein said manually activated means includes a solenoid, a switch for energizing said solenoid, and means interconnecting the armature of the solenoid and said shaft.

13. The apparatus of claim 12 wherein said interconnecting means includes a pivoted link connected to said shaft at one end and the armature at the other end.

14. The apparatus of claim 4 wherein said shaft has a notch formed therein and said retention means includes a rod, one end of which is formed to fit into said notch and prevent movement of said shaft.

15. The apparatus of claim 14 wherein said force responsive means includes a rack formed at the other end of the rod and a pinion intermeshing with said rack to move said rod.

16. The apparatus of claim 15 wherein said force responsive means includes electrical actuator means responsive to said vehicle being subjected to extraordinary forces to rotate said pinion by which said rod is unseated from said notch.

17. The apparatus of claim 16 wherein said actuator means includes a motor and a pendulum switch for energizing said motor.

18. Apparatus for interrupting an electrical circuit on a vehicle to which power is supplied from a battery on said vehicle to one or more electrical components utilized on said vehicle, said apparatus comprising:
   circuit breaker means mounted on said battery and connected in said electrical circuit between said battery and said electrical components, said circuit breaker means having a closed position in which power flows through said electrical circuit and an open position in which power flow is interrupted;
   switch means coupled to said circuit breaker means for holding said circuit breaker means in its closed position and for moving said circuit breaker means from its closed position to its open position; and
   force responsive means coupled to said switch means for actuating said switch means, said force responsive means including first and second actuation means each of which is independent of the other, one of said actuation means being aligned with the longitudinal axis of said vehicle and the other said actuation means being aligned with the transverse axis of said vehicle, said switch means responsive to either one of said first and second actuation means to interrupt said electrical circuit in response to an extraordinary force acting on said vehicle.

19. The apparatus as in claim 18 further comprising a cover fitting substantially over said battery and enclosing said circuit breaker means, said switch means and said force responsive means, said cover including integrally formed supports for elements comprising said circuit breaker means, said switch means and said force responsive means.

* * * * *